(12) United States Patent
Sun et al.

(10) Patent No.: US 10,137,727 B1
(45) Date of Patent: Nov. 27, 2018

(54) WHEEL FASTENING SYSTEM FOR MOBILE ROBOT WITH WHEELS

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Chun Sun, New Taipei (TW); Zhan-Sheng Lu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/863,846

(22) Filed: Jan. 5, 2018

(30) Foreign Application Priority Data

Nov. 21, 2017 (CN) .......................... 2017 1 1168066

(51) Int. Cl.
| | |
|---|---|
| *A47L 9/00* | (2006.01) |
| *B60B 3/16* | (2006.01) |
| *B25J 5/00* | (2006.01) |
| *B60B 3/14* | (2006.01) |
| *B60K 7/00* | (2006.01) |
| *B60B 35/18* | (2006.01) |

(52) U.S. Cl.
CPC ................ *B60B 3/16* (2013.01); *A47L 9/009* (2013.01); *B25J 5/007* (2013.01); *B60B 3/145* (2013.01); *B60B 35/18* (2013.01); *B60K 7/0007* (2013.01)

(58) Field of Classification Search
USPC ....... 301/111.05; 384/26, 91, 121, 125, 303, 384/420, 416, 440
See application file for complete search history.

(56) References Cited

U.S. PATENT DOCUMENTS

| | | | | |
|---|---|---|---|---|
| 3,608,661 | A * | 9/1971 | Arnot ................... | B60K 7/0007 180/10 |
| 5,023,444 | A * | 6/1991 | Ohman ..................... | F16P 3/16 180/274 |
| 5,095,577 | A * | 3/1992 | Jonas .................... | A47L 9/0009 15/315 |
| 5,369,347 | A * | 11/1994 | Yoo ..................... | A47L 11/4005 15/319 |
| 5,682,313 | A * | 10/1997 | Edlund ............... | A47L 11/4061 342/127 |
| 5,778,645 | A * | 7/1998 | Irikura ................... | A01D 34/69 56/11.8 |
| 5,841,259 | A * | 11/1998 | Kim .......................... | A47L 5/32 318/587 |
| 5,861,590 | A * | 1/1999 | Amonett .............. | H01H 43/102 200/11 R |
| 5,867,800 | A * | 2/1999 | Leif .................... | A47L 11/4011 180/167 |
| 6,474,434 | B1 * | 11/2002 | Bech ...................... | B60B 19/00 180/21 |

(Continued)

*Primary Examiner* — Erez Gurari
(74) *Attorney, Agent, or Firm* — ScienBiziP, P.C.

(57) ABSTRACT

A wheel fastening system for a wheeled mobile robot includes a chassis, a motor, a wheel, and a thrust bearing. The motor is disposed in the chassis, and the motor turns a shaft connected to the wheel. The thrust bearing is an interference fit between the wheel and the chassis and provides axial support for the wheel to hold the position of the wheel. The wheeled mobile robot does not deviate from a chosen path during movement.

20 Claims, 4 Drawing Sheets

(56) References Cited

U.S. PATENT DOCUMENTS

| | | | | |
|---|---|---|---|---|
| 7,100,722 | B2* | 9/2006 | Bowen | B60K 7/0007 180/65.51 |
| 7,389,156 | B2* | 6/2008 | Ziegler | A22C 17/0013 318/568.1 |
| 7,474,941 | B2* | 1/2009 | Kim | A47L 9/009 15/319 |
| 7,620,476 | B2* | 11/2009 | Morse | A47L 5/14 15/319 |
| 8,087,117 | B2* | 1/2012 | Kapoor | A47L 9/106 15/52.1 |
| 8,382,906 | B2* | 2/2013 | Konandreas | A22C 17/0013 134/21 |
| 8,438,695 | B2* | 5/2013 | Gilbert, Jr. | A47L 11/34 15/319 |
| 9,855,992 | B1* | 1/2018 | Liang | B60K 7/0007 |
| 2006/0200281 | A1* | 9/2006 | Ziegler | A47L 11/4072 701/23 |
| 2007/0016328 | A1* | 1/2007 | Ziegler | A47L 5/14 700/245 |
| 2009/0126143 | A1* | 5/2009 | Haegermarck | A47L 9/00 15/319 |
| 2012/0215355 | A1* | 8/2012 | Bewley | B25J 5/005 700/258 |
| 2017/0058975 | A1* | 3/2017 | Szewczyk | F16D 55/225 |
| 2017/0233024 | A1* | 8/2017 | Zuo | B60L 11/1805 180/208 |
| 2017/0253287 | A1* | 9/2017 | Zuo | H02K 33/00 |

* cited by examiner

WHEEL FASTENING SYSTEM FOR MOBILE ROBOT WITH WHEELS

CROSS REFERENCE TO RELATED APPLICATION

This application claims priority to Chinese Patent Application No. 201711168066.1, filed on Nov. 21, 2017, the disclosure of which is incorporated herein by reference in its entirety.

FIELD

The present disclosure relates generally to mobile robot controls, and more particularly to a wheel fastening system for a wheeled mobile robot.

BACKGROUND

Mobile robots are classified as wheeled, legged, or tracked. The wheeled mobile robots are driven by wheels to achieve movement thereof. However, during movement of the wheeled mobile robot, the wheel may fail to be properly secured such that the direction of movement is not precise. Thus, the work productivity is low and damage can happen.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
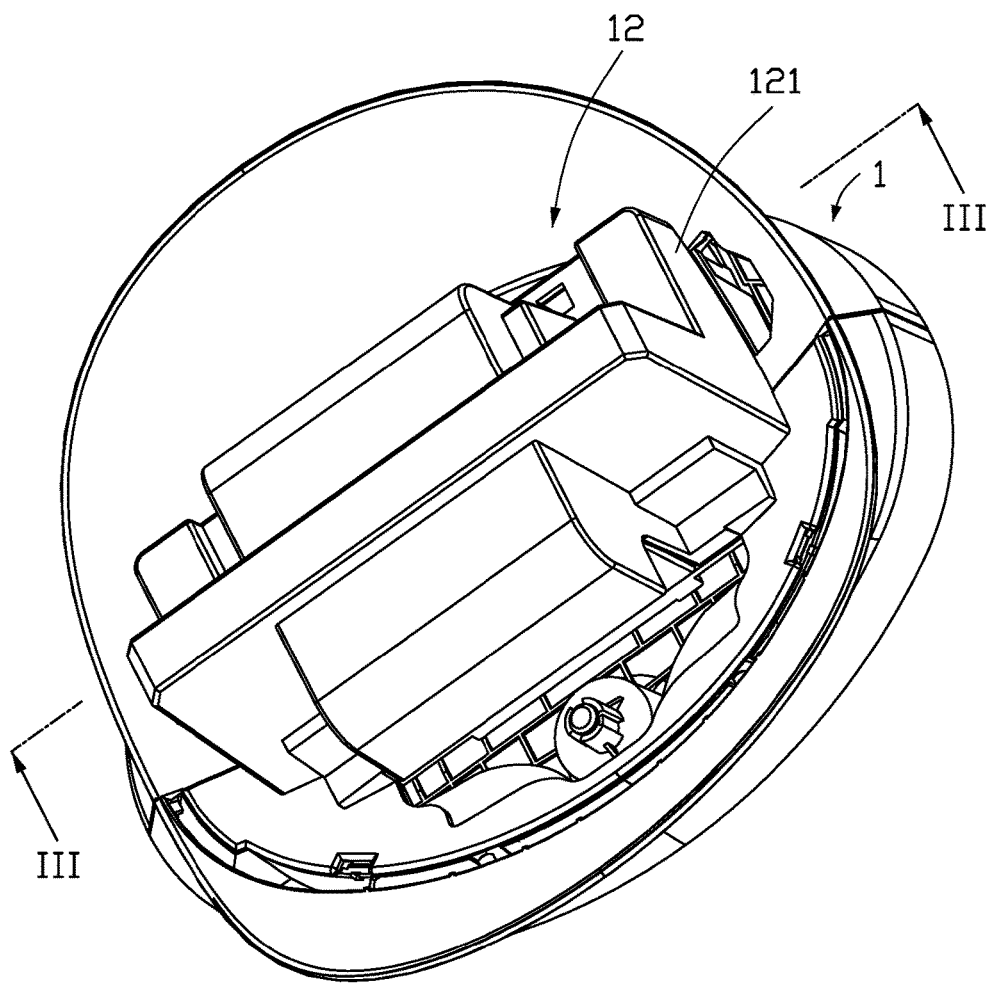
FIG. 1 is a top perspective view of a wheel fastening system for a wheeled mobile robot.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Figure 2:
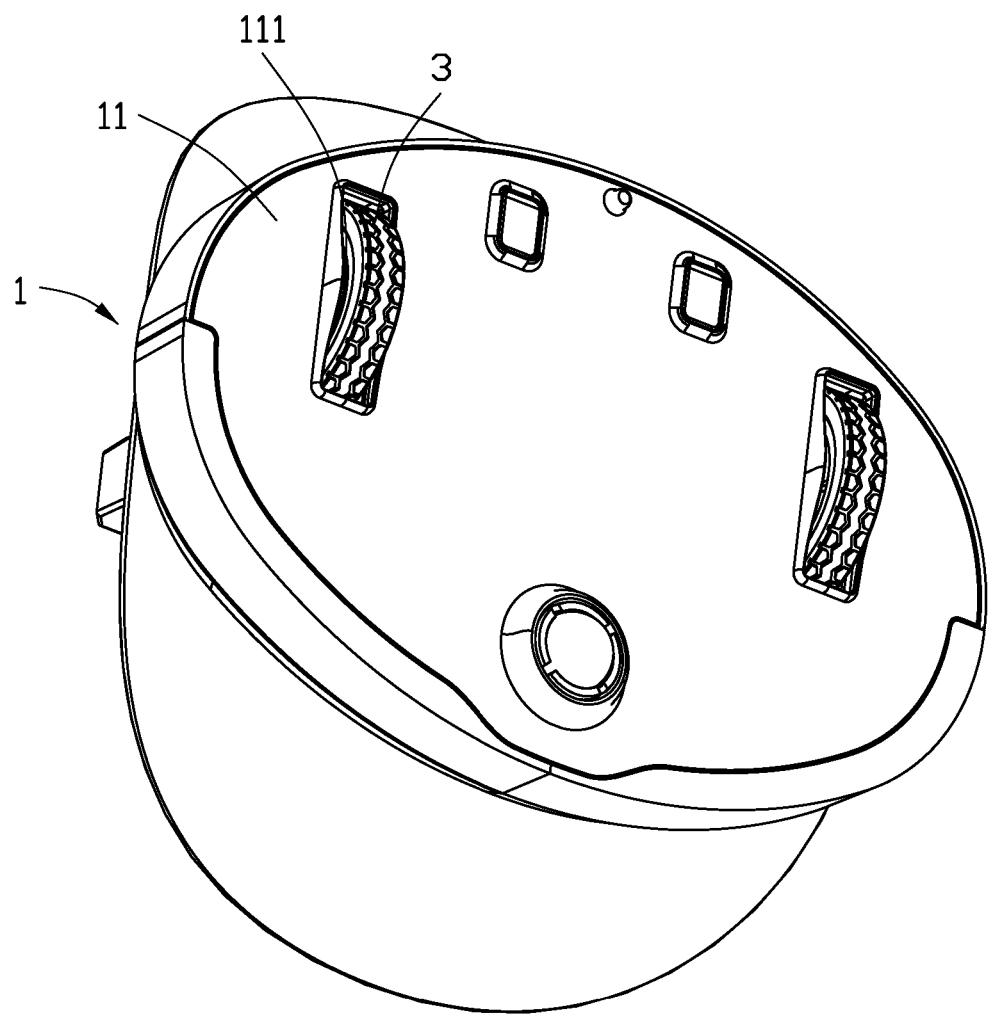
FIG. 2 is a bottom perspective view of the wheel fastening system of FIG. 1.
Figure 3:
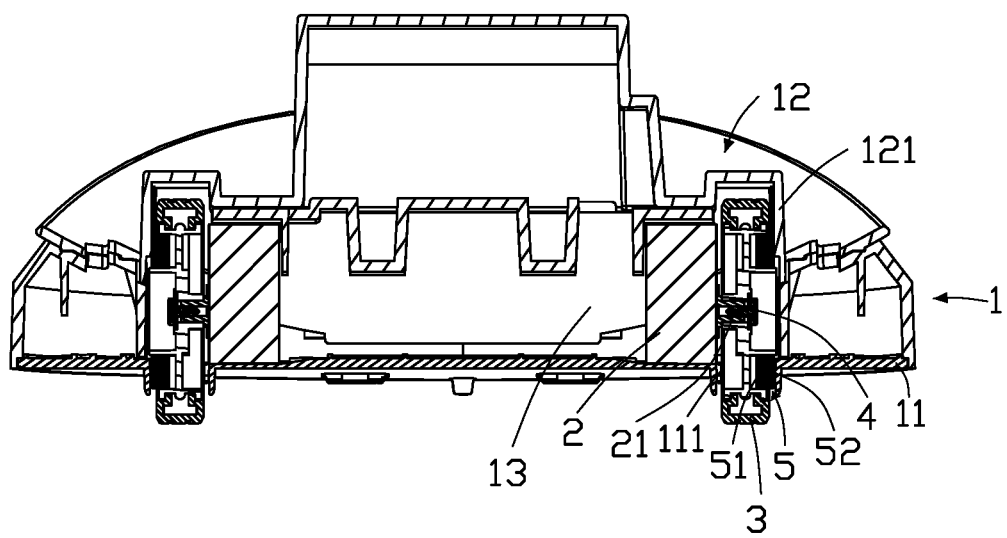
FIG. 3 is a cross-sectional view taken along line in FIG. 1.

With reference to FIGS. 1-3, an exemplary embodiment of a wheel fastening system for a wheeled mobile robot includes a chassis 1, a motor 2, a wheel 3, a screw 4, and a thrust bearing 5.

The chassis 1 includes a base 11, a cover 12, and a chamber 13. The base 11 is oval shaped. The base 11 has a slot 111. The cover 12 covers the base 11. The cover 12 has a side wall 121. The chamber 13 is defined between the base 11 and the cover 12.

The motor 2 is securely disposed within the chamber 13 of the chassis 1. The motor 2 has a shaft 21 to output torque.

Figure 4:
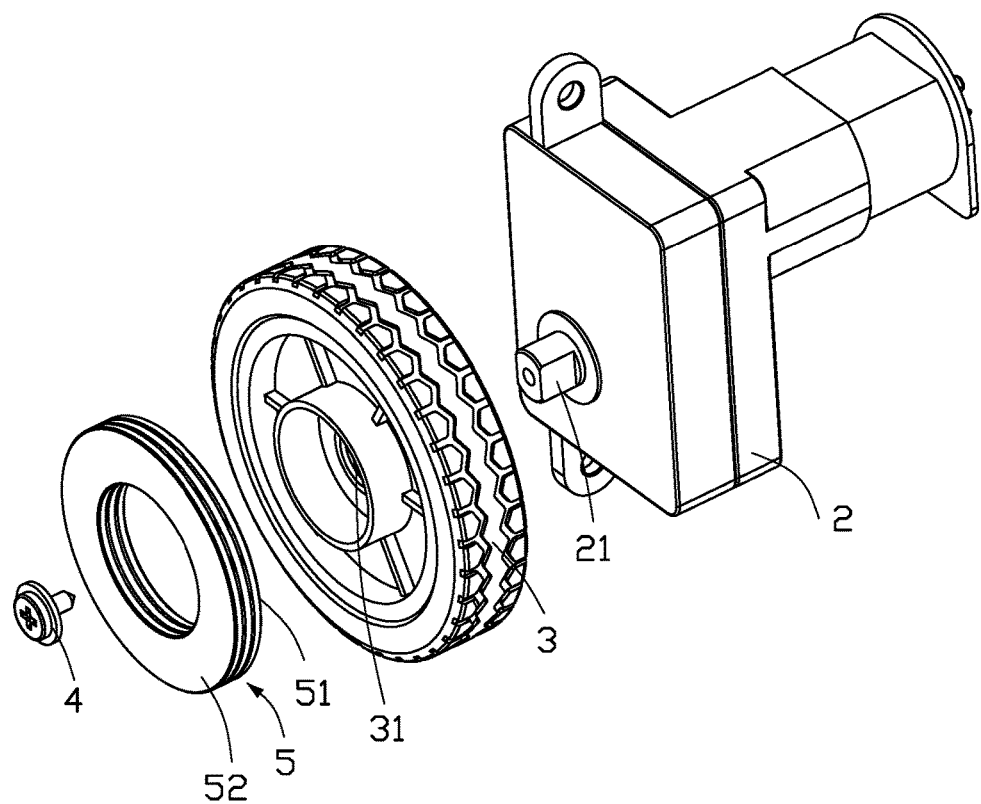
FIG. 4 is a partially exploded perspective view of the wheel fastening system of FIG. 1.

With further reference to FIG. 4, the wheel 3 has a hub 31 by which the wheel 3 is centered on the shaft 21 of the motor 2. The motor 2 drives the wheel 3. The wheel 3 is partially disposed in the chamber 13 of the chassis 1 and partially protrudes out of the slot 111 of the base 11 of the chassis 1.

The screw 4 passes through the hub 31 of the wheel 3 and is coupled to the shaft 21 of the motor 2 to secure the wheel 3 to the shaft 21 of the motor 2.

The thrust bearing 5 is an interference fit between the wheel 3 and the side wall 121 of the cover 12 of the chassis 1. The thrust bearing 5 withstands axial loads applied to the wheel 3. The thrust bearing 5 has a shaft washer 51 and a housing washer 52. The shaft washer 51 abuts the wheel 3 to rotate with the wheel 3. The housing washer 52 abuts the side wall 121 of the cover 12 of the chassis 1 and does not rotate. The thrust bearing 5 is conventional and thus a detailed description thereof will be omitted.

The thrust bearing 5 provides axial support for the wheel 3 to strictly hold the position of the wheel 3. Thus, the wheeled mobile robot does not deviate from a chosen direction during movement, to ensure a stable working productivity and prevent damage.

In a preferred exemplary embodiment, the wheel fastening system includes two motors 2, two wheels 3, two screws 4, and two thrust bearings 5, and the cover 12 of the chassis 1 has two side walls 121. The two motors 2 are securely disposed on each side of the chamber 13 of the chassis 1. The two wheels 3 are connected to the motors 2 by screws 4. The two thrust bearings 5 are an interference fit between the two wheels 3 and the two side walls 121 of the cover 12 of the chassis 1.

The exemplary embodiments shown and described above are only examples.

Many details are often found in the art such as the other features of a wheeled mobile robot. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A wheel fastening system for a wheeled mobile robot comprising:
a chassis;
a motor disposed in the chassis, and the motor having a shaft;
a wheel centered on the shaft of the motor; and
a thrust bearing interference fit between the wheel and the chassis, and the thrust bearing withstanding axial loads applied to the wheel.

2. The wheel fastening system of claim 1,
wherein the chassis comprises:
a base;

a cover covering the base; and a chamber defined between the base and the cover; and wherein the motor is disposed within the chamber of the chassis.

3. The wheel fastening system of claim 2, wherein the cover has a side wall; and wherein the thrust bearing is an interference fit between the wheel and the side wall of the cover, and the thrust bearing has:

a shaft washer abutting the wheel to rotate with the wheel; and a housing washer abutting the side wall of the cover and not rotating.

4. The wheel fastening system of claim 2, wherein the base has a slot; and wherein the wheel is partially disposed in the chamber of the chassis and partially protrudes out of the slot of the base.

5. The wheel fastening system of claim 3, wherein the base has a slot; and wherein the wheel is partially disposed in the chamber of the chassis and partially protrudes out of the slot of the base.

6. The wheel fastening system of claim 2, wherein the base is oval shaped.

7. The wheel fastening system of claim 3, wherein the base is oval shaped.

8. The wheel fastening system of claim 4, wherein the base is oval shaped.

9. The wheel fastening system of claim 5, wherein the base is oval shaped.

10. The wheel fastening system of claim 1, wherein the wheel has a hub by which the wheel is centered on the shaft of the motor.

11. The wheel fastening system of claim 2, wherein the wheel has a hub by which the wheel is centered on the shaft of the motor.

12. The wheel fastening system of claim 3, wherein the wheel has a hub by which the wheel is centered on the shaft of the motor.

13. The wheel fastening system of claim 4, wherein the wheel has a hub by which the wheel is centered on the shaft of the motor.

14. The wheel fastening system of claim 5, wherein the wheel has a hub by which the wheel is centered on the shaft of the motor.

15. The wheel fastening system of claim 6, wherein the wheel has a hub by which the wheel is centered on the shaft of the motor.

16. The wheel fastening system of claim 10, further comprising a screw, wherein the screw passes through the hub of the wheel and is coupled to the shaft of the motor to secure the wheel to the shaft of the motor.

17. The wheel fastening system of claim 11, further comprising a screw, wherein the screw passes through the hub of the wheel and is coupled to the shaft of the motor to secure the wheel to the shaft of the motor.

18. The wheel fastening system of claim 12, further comprising a screw, wherein the screw passes through the hub of the wheel and is coupled to the shaft of the motor to secure the wheel to the shaft of the motor.

19. The wheel fastening system of claim 13, further comprising a screw, wherein the screw passes through the hub of the wheel and is coupled to the shaft of the motor to secure the wheel to the shaft of the motor.

20. The wheel fastening system of claim 14, further comprising a screw, wherein the screw passes through the hub of the wheel and is coupled to the shaft of the motor to secure the wheel to the shaft of the motor.

* * * * *